US012368989B2

(12) United States Patent
Liu

(10) Patent No.: US 12,368,989 B2
(45) Date of Patent: Jul. 22, 2025

(54) HEADSET

(71) Applicant: Huawei Technologies Co., Ltd., Shenzhen (CN)

(72) Inventor: Guoqing Liu, Dongguan (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 266 days.

(21) Appl. No.: 18/042,039

(22) PCT Filed: Aug. 10, 2021

(86) PCT No.: PCT/CN2021/111662
§ 371 (c)(1),
(2) Date: Feb. 17, 2023

(87) PCT Pub. No.: WO2022/037434
PCT Pub. Date: Feb. 24, 2022

(65) Prior Publication Data

US 2023/0328422 A1 Oct. 12, 2023

(30) Foreign Application Priority Data

Aug. 20, 2020 (CN) ........................ 202010844717.X

(51) Int. Cl.
*H04R 1/10* (2006.01)
*H04R 3/12* (2006.01)

(52) U.S. Cl.
CPC ......... *H04R 1/1041* (2013.01); *H04R 1/1091* (2013.01); *H04R 3/12* (2013.01); *H04R 2201/109* (2013.01)

(58) Field of Classification Search
CPC ....... H04R 1/1041; H04R 1/1091; H04R 3/12
See application file for complete search history.

(56) References Cited

U.S. PATENT DOCUMENTS 12,177,624 B2 * 12/2024 Qian .................... H04R 1/1091
2012/0003937 A1 * 1/2012 Zhong ................. H04M 1/6066
455/41.3
2019/0306609 A1 * 10/2019 Lee ........................ H04R 5/033
2022/0038807 A1 * 2/2022 Zhao .................... H04R 1/1091
2023/0007411 A1 * 1/2023 Jidge .................... H04R 25/552

FOREIGN PATENT DOCUMENTS

CN 110536196 A 12/2019
EP 0611111 A1 8/1994

* cited by examiner

*Primary Examiner* — Simon King
(74) *Attorney, Agent, or Firm* — Conley Rose, P.C.

(57) ABSTRACT

A headset includes a first through hole and a second through hole disposed in a housing. In this configuration, when the headset is worn on a left ear, the first through hole communicates with an auditory canal, the second through hole is partially or completely shielded by the ear, and the first through hole can propagate sound to the left ear, when the headset is worn on a right ear, the second through hole communicates with an auditory canal, the first through hole is partially or completely shielded by the ear, and the second through hole can propagate sound to the auditory canal.

20 Claims, 6 Drawing Sheets

HEADSET

CROSS-REFERENCE TO RELATED APPLICATIONS

This application is a U.S. National Stage of International Patent Application No. PCT/CN2021/111662 filed on Aug. 10, 2021, which claims priority to Chinese Patent Application No. 202010844717.X filed on Aug. 20, 2020, both of which are hereby incorporated by reference in their entireties.

TECHNICAL FIELD

This application relates to the field of electronic device technologies, and in particular, to a headset.

BACKGROUND

With the development of technologies, a headset has become a commonly used audio output device of people. By wearing the headset, privacy of a user can be protected, a sound transmission effect can be improved, and impact on a bystander can be reduced. The headset may include one or two headset bodies. Generally, each headset body can be worn only on a left ear or a right ear, and cannot be interchanged between the left ear and the right ear. As a result, when the user wears the headset bodies reversely, an audio play effect is reduced.

SUMMARY

This application provides a headset, to solve a problem in the conventional technology that the headset cannot be interchanged for use between a left ear and a right ear, and improve sound transmission quality of the headset.

This application provides a headset, including: a housing,

- where a first through hole and a second through hole are disposed in the housing, and the headset plays a sound signal by using the first through hole and the second through hole; and
- when the headset is worn on a left ear, the first through hole communicates with an auditory canal, and the second through hole is partially or completely shielded; and when the headset is worn on a right ear, the second through hole communicates with an auditory canal, and the first through hole is partially or completely shielded.

With such a design, when being worn on the left ear or the right ear, the headset can separately communicate with the auditory canal of the left ear by using the first through hole or communicate with the auditory canal of the right ear by using the second through hole, so that the headset can be interchanged for use between the left ear and the right ear. In actual use, the headset can be worn without distinguishing between the left ear and the right ear, and thus is more convenient in use.

In a possible implementation, the headset further includes:

- a first sensor and a second sensor that are configured to determine whether the headset is worn on the left ear or the right ear.

The first sensor and the second sensor can detect whether the headset is worn on the left ear or the right ear, so that an electronic device connected to the headset outputs corresponding left and right sound channels to the headset, thereby improving use experience of a user.

In a possible implementation, the first sensor is located on a side of the first through hole away from the second through hole, and the second sensor is located on a side of the second through hole away from the first through hole.

With such a design, the sensors can detect positions of the first through hole and the second through hole conveniently, so as to detect whether the first through hole and the second through hole are shielded by skin of human ears. Further, a processor can determine, based on a detection result, whether the headset is worn on the left ear or the right ear.

In a possible implementation, a third through hole is disposed in the housing, and the headset plays a sound signal by using the third through hole; and

- when the headset is worn on the left ear, a first portion of the third through hole communicates with the auditory canal, and a second portion of the third through hole is shielded; and when the headset is worn on the right ear, a third portion of the third through hole communicates with the auditory canal, and a fourth portion of the third through hole is shielded.

With such a design, the headset conveniently communicates with the auditory canal of the human ear when being worn. Regardless of whether the headset is worn on the left ear or the right ear, the third through hole can partially communicate with the auditory canal, so that the headset can be interchanged for use between the left ear and the right ear, and is more convenient in actual use.

In a possible implementation, in a width direction of the housing, a width of the third through hole is 6 mm to 12 mm.

With such a design, regardless of whether the headset is worn on the left ear or the right ear, a portion of the third through hole can communicate with the auditory canal of the human ear.

In a possible implementation, an area of the third through hole is greater than or equal to 10 square millimeters and less than or equal to 30 square millimeters.

With such a design, a size of the third through hole can be within a proper range, thereby reducing a possibility that a sound leakage condition occurs as a result of a too large area of the third through hole and a possibility that the third through hole cannot communicate with the auditory canal as a result of a too small area of the third through hole after the headset is interchanged between the left ear and the right ear.

In a possible implementation, the headset further includes:

- a first sensor and a second sensor that are configured to determine whether the headset is worn on the left ear or the right ear.

The first sensor and the second sensor can detect whether the headset is worn on the left ear or the right ear, so that an electronic device connected to the headset outputs corresponding left and right sound channels to the headset, thereby improving use experience of a user.

In a possible implementation, the third through hole has a first side edge and a second side edge that are disposed oppositely in the width direction of the housing, the first sensor is close to the first side edge, and the second sensor is close to the second side edge.

With such a design, a relative position of the third through hole can be conveniently detected, so as to detect a portion that is of the third through hole and that communicates with the auditory canal. Further, a processor can determine, based on a detection result, whether the headset is worn on the left ear or the right ear.

This application provides a headset. A first through hole and a second through hole may be disposed in a housing of the headset. When the headset is worn on a left ear, the first through hole communicates with an auditory canal, the second through hole is partially or completely shielded by skin of the human ear, and the first through hole is configured to propagate a sound signal to the human ear. When the headset is worn on a right ear, the second through hole communicates with an auditory canal, the first through hole is partially or completely shielded by skin of the human ear, and the second through hole is configured to propagate a sound signal to the auditory canal. With such a design, the headset can be interchanged for use between the left ear and the right ear, and regardless of whether the headset is worn on the left ear or the right ear, a sound hole of the headset can communicate with the auditory canal, thereby facilitating use and improving sound transmission quality.

The accompanying drawings herein are incorporated into the specification and form a part of the specification, show embodiments conforming to this application, and are used together with the specification to explain a principle of this application.

BRIEF DESCRIPTION OF DRAW NGS

REFERENCE NUMERALS

Figure 1:
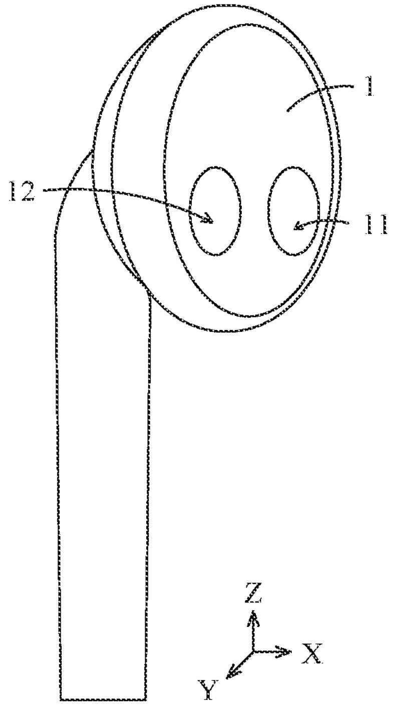
FIG. 1 is a schematic diagram of a structure of an embodiment of a housing of a headset body according to an embodiment of this application.

1, housing body;
11, first sound part;
12, second sound part;
13, first side edge;
14, second side edge;
2, first sensor;
3, second sensor; and
4, earbud.

The accompanying drawings herein are incorporated into the specification and form a part of the specification, show embodiments conforming to this application, and are used together with the specification to explain a principle of this application.

DESCRIPTION OF EMBODIMENTS

To better understand the technical solutions of this application, the following describes embodiments of this application in detail with reference to the accompanying drawings.

It should be clear that the described embodiments are merely some rather than all of embodiments of this application. All other embodiments obtained by a person of ordinary skill in the art based on embodiments of this application without creative efforts shall fall within the protection scope of this application.

The terms used in embodiments of this application are merely for the purpose of illustrating specific embodiments, and are not intended to limit this application. The terms "a" and "the" of singular forms used in embodiments and the appended claims of this application are also intended to include plural forms, unless otherwise specified in the context clearly.

It should be understood that the term "and/or" in this specification describes only an association relationship for describing associated objects and represents that three relationships may exist. For example, A and/or B may represent the following three cases: Only A exists, both A and B exist, and only B exists. In addition, the character "/" in this specification generally indicates an "or" relationship between the associated objects.

It should be noted that, position words such as "above", "below", "left", and "right" described in embodiments of this application are described from angles shown in the accompanying drawings, and should not be construed as a limitation on embodiments of this application. Moreover, in the context, it also should be understood that, when it is mentioned that one element is connected "above" or "below" another element, the element can be directly connected "above" or "below" the another element, or may be indirectly connected "above" or "below" the another element by using an intermediate element.

With the improvement of people's living standards, electronic devices such as mobile phones, tablet computers, and notebook computers have gradually become common communication devices used by people. Compared with a manner in which an acoustics component of the electronic device is adopted for playback, wearing a headset can protect privacy of a user, and can further improve a sound transmission effect, so that quality of sound received by a human ear is higher. People usually listen to audio of the electronic device by using a headset connected to the electronic device. The headset includes one or two headset bodies. The user wears the headset body on an ear, and the headset body may be connected to the electronic device in a wired or wireless manner, and outputs audio of the electronic device to the user. When the headset includes one headset body, the headset body can be worn only on one ear, for example, can be worn only on a left ear or only on a right ear, and cannot be interchanged for use between the left ear and the right ear. The user needs to determine whether the headset body is worn on the left ear or the right ear before use, and thus use experience of the user is reduced. When the headset includes two headset bodies, each headset body can independently correspond to the left ear or the right ear, and cannot interchanged for use between the left ear and the right ear. As a result, when in use, the headset body can be worn for use only after the user distinguishes the left headset body from the right headset body; and is inconvenient to use. When the user wears the headset bodies reversely, the sound transmission effect is poor, and the use experience of the user is seriously affected.

In view of this, embodiments of this application provide a headset, to solve a problem in the conventional technology that a headset body cannot be interchanged between a left ear and a right ear, and improve sound transmission quality of the headset.

FIG. 1 is a schematic diagram of a structure of an embodiment of a housing of a headset body according to an embodiment of this application. This embodiment of this application provides a headset. The headset may include one or two headset bodies that are worn on a human ear. The headset body has a housing that may include a first through hole and a second through hole, and the first through hole and the second through hole may serve as sound holes of the housing. The first through hole is a first sound part 11, the second through hole is a second sound part 12, and the first sound part 11 and the second sound part 12 are located on a side of the housing facing an auditory canal of the human ear. Specifically, when the housing is worn on a left ear, the first sound part 11 communicates with an auditory canal of the left ear, and the second through hole is completely or partially shielded by skin of the human ear. When the headset is configured to play audio, the audio played by a loudspeaker of the headset can be transmitted to the auditory canal of the left ear by using the first sound part 11. When the housing is worn on a right ear, the second sound part 12 communicates with an auditory canal of the right ear, and the first through hole is completely or partially shielded by skin of the human ear. When the headset is configured to play audio, the audio played by the loudspeaker of the headset can be transmitted to the auditory canal of the right ear by using the second sound part 12.

With such a design, when in use, the housing of the headset body can be interchanged for use between the left ear and the right ear. Regardless of whether the headset is worn on the left ear or the right ear, at least a portion of the sound hole is not shielded by the skin and communicates with the auditory canal of the human ear, so that sound is conveniently transmitted to the auditory canal of the human ear by using the sound hole, and sound can be transmitted into a corresponding auditory canal of the user by using the first sound part 11 or the second sound part 12. Therefore, loss of the sound in a transmission process is reduced, and sound transmission quality of the headset can be improved.

Compared with a manner in which the headset body is interchanged for use between the left ear and the right ear by disposing the sound hole in a surface of the housing of the headset body not facing the auditory canal and transmitting sound through a gap between the housing and the skin of the human ear, the housing of the headset body provided in this embodiment of this application can enable the sound hole to communicate with the auditory canal, so that the sound is more conveniently transmitted to the auditory canal by using the sound hole. In the manner in which the sound hole is disposed in the surface of the housing not facing the auditory canal of the human ear, the sound hole cannot directly communicate with the auditory canal when in use, and sound can be propagated only along the gap between the headset and the skin of the human ear, thereby resulting in a poor propagation effect and lower sound transmission quality, and affecting use experience of the user. However, regardless of whether the housing of the headset body provided in this embodiment of this application is worn on the left ear or the right ear when in use, the sound hole can communicate with the auditory canal of the left ear or the auditory canal of the right ear by using the first sound part 11 or the second sound part 12. Sound can be transmitted to the auditory canal of the left ear or the auditory canal of the right ear by using the first sound part 11 or the second part 12, so that loss of the sound in the transmission process is reduced, and sound transmission quality is improved.

Figure 2:
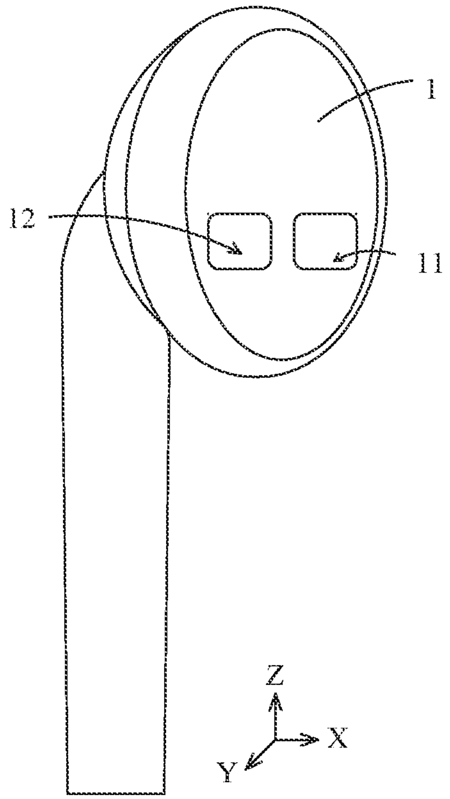
FIG. 2 is a schematic diagram of a structure of another embodiment of a housing of a headset body according to an embodiment of this application.

FIG. 2 is a schematic diagram of a structure of another embodiment of a housing of a headset body according to an embodiment of this application. In a possible implementation, a sound hole includes a first through hole and a second through hole, where the first through hole may serve as a first sound part 11, and the second through hole may serve as a second sound part 12.

A manner of disposing the first sound part 11 and the second sound part 12 as through holes has advantages of being simpler in structure and lower in processing difficulty, and further facilitates practical production. In addition, obstruction in a transmission process of sound can be reduced by using the through holes. When in use, when a user wears the headset body on a left ear, the first through hole communicates with an auditory canal of the left ear so as to transmit sound to the auditory canal of the left ear by using the first through hole. When the user wears the headset body on a right ear, the second through hole communicates with an auditory canal of the right ear so as to transmit sound to the auditory canal of the right ear by using the second through hole. Therefore, sound transmission quality is improved, and use experience of the user is improved.

It should be noted herein that a shape of the through hole includes but is not limited to the shape shown in the accompanying drawings in the embodiments of this application. Other shapes such as triangles and ovals may also be applied to the solutions provided in the embodiments of this application.

Figure 3:
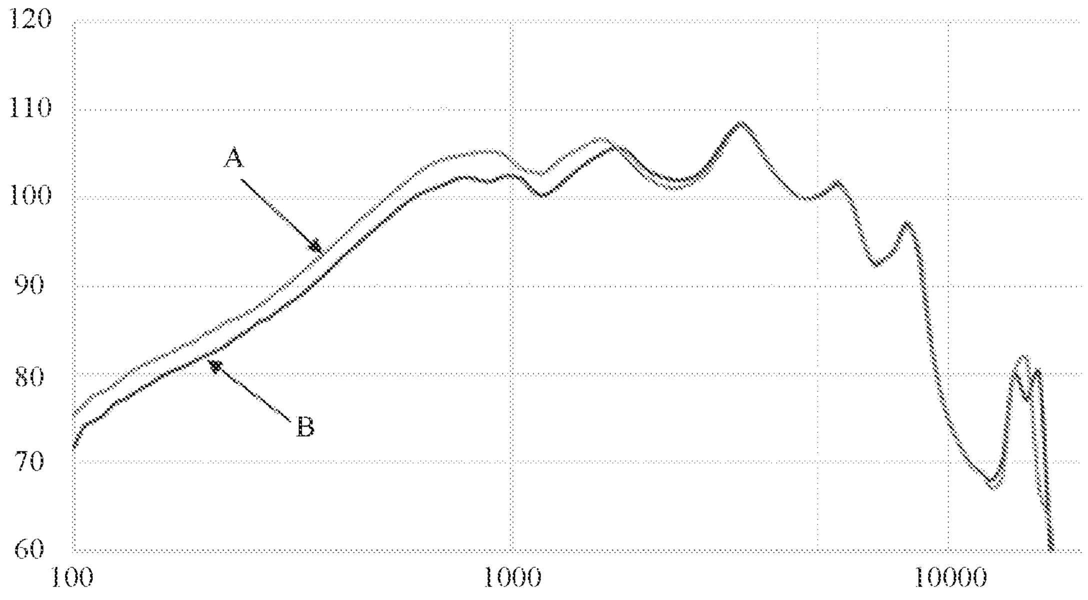
FIG. 3 is a frequency response curve of another embodiment of a housing of a headset body according to an embodiment of this application.

FIG. 3 is a frequency response curve of another embodiment of a housing of a headset body according to an embodiment of this application, that is, a frequency response curve of the embodiment shown in FIG. 2 in actual use. A horizontal coordinate indicates frequency of sound, and a vertical coordinate indicates loudness. A curve A in the figure is a curve obtained by measuring in actual use of this embodiment of this application, a curve B is a curve measured during actual use of the headset in which the sound hole is disposed on an end surface of the headset body not facing the auditory canal and sound is transmitted through the gap between the housing and the skin of the human ear. The solution provided in this embodiment of this application can improve an effect of playing at a medium and low frequency band by 3 to 5 decibels, so that sound transmission quality is improved.

Figure 4:
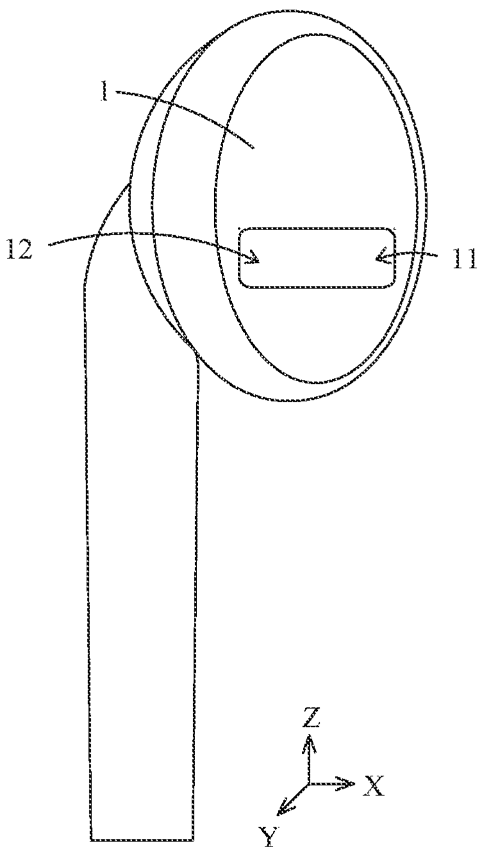
FIG. 4 is a schematic diagram of a structure of still another embodiment of a housing of a headset body according to an embodiment of this application.

FIG. 4 is a schematic diagram of a structure of still another embodiment of a housing of a headset body according to an embodiment of this application. This embodiment of this application provides a headset, including a headset body worn on a human ear, and a housing of the headset body may include a third through hole which may serve as a sound hole to play a sound signal. When the headset is worn on a left ear, a first portion of the third through hole communicates with an auditory canal of the left ear and a second portion of the third through hole is shielded by skin of the human ear. The portion, which communicates with the auditory canal of the left ear, forms a first sound part 11 so as to play a sound signal to the human ear. When the headset is worn on a right ear, a third portion of the third through hole communicates with an auditory canal of the right ear, and a fourth portion of the third through hole is shielded by skin of the human ear. The portion, which communicates with the auditory canal of the right ear, forms a second sound part 12 so as to play a sound signal to the human ear.

With such a design, only one through hole needs to be processed in the housing, and therefore, processing difficulty is lower, processing steps can be simplified, and processing efficiency is improved. The third through hole has a larger area, so that a portion of the third through hole can more conveniently communicate with the auditory canal of the human ear, thereby improving sound transmission quality of the headset.

In a possible implementation, in a width direction Y of the housing, a width range of the third through hole is 6 mm to 12 mm.

With such a design, regardless of whether the headset body is worn on the left ear or the right ear, a portion of the third through hole can communicate with the auditory canal of the human ear.

Figure 5:
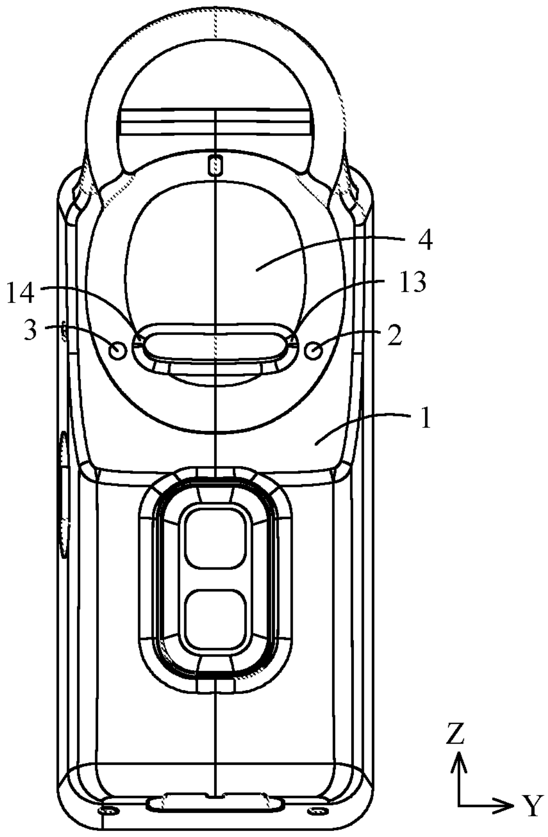
FIG. 5 is a schematic diagram of a structure of yet another embodiment of a housing of a headset body according to an embodiment of this application.

FIG. 5 is a schematic diagram of a structure of yet another embodiment of a housing of a headset body according to an embodiment of this application. The housing may include a housing body 1 and an earbud 4, the housing body 1 is connected to the earbud 4, and a third through hole is disposed in the earbud 4. Specifically, the housing body 1 may be made of relatively hard materials such as plastic, the earbud 4 may be made of relatively soft materials such as rubber, and at least a portion of the earbud 4 may extend into an auditory canal of a human ear. The housing body 1 may be configured to mount a component such as a loudspeaker, and the earbud 4 may be configured to protect the human ear, so that wearing comfort of the headset is improved. In addition, the earbud 4 can further fix the headset body, so that the headset body is not easily detached from the human ear.

Figure 6:
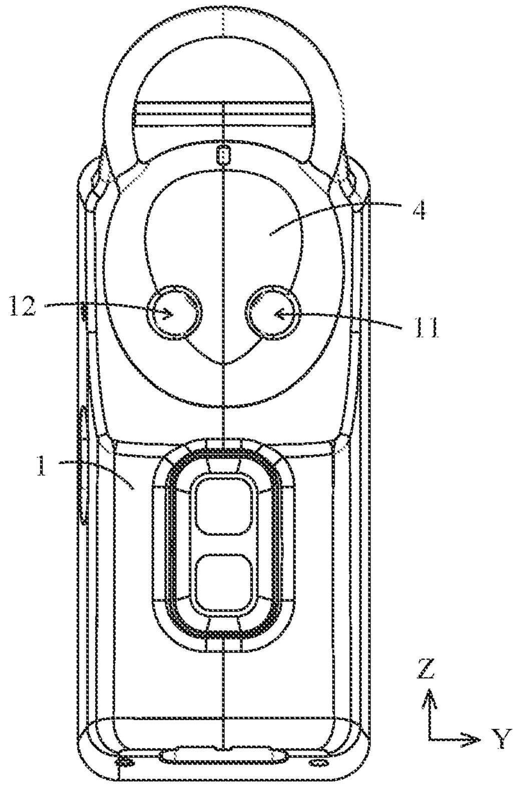
FIG. 6 is a schematic diagram of a structure of still yet another embodiment of a housing of a headset body according to an embodiment of this application.

FIG. 6 is a schematic diagram of a structure of still yet another embodiment of a housing of a headset body according to an embodiment of this application. In a specific implementation, a first sound part 11 and a second sound part 12 may be disposed on an earbud 4.

The earbud 4 is usually made of relatively soft materials such as rubber by injection molding, and is more convenient to process. Being usually made of relatively soft materials such as rubber, the earbud 4 can generate elastic deformation when being worn on a human ear, so as to better fit to skin of the human ear, reduce sound leakage, and improve sound transmission quality.

Figure 7:
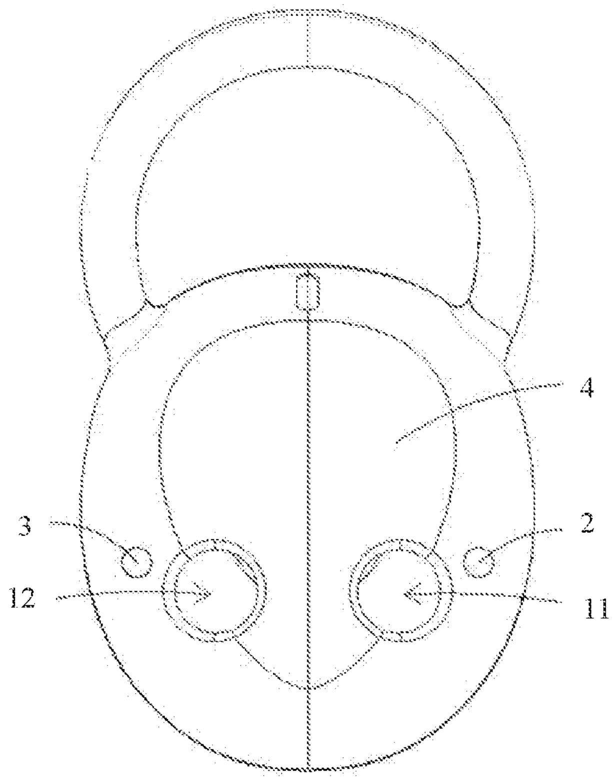
FIG. 7 is a schematic diagram of a structure of an earbud according to an embodiment of this application.

FIG. 7 is a schematic diagram of a structure of an earbud 4 according to an embodiment of this application. A side of the earbud 4 facing an auditory canal may be an arc surface, so as to fit to skin of a human ear and reduce a possibility of sound leakage.

A side of a housing facing the human ear has a contact surface that is configured to be in contact with the skin of the human ear. A sound part is disposed on the contact surface, the sound part (including a first sound part 11 and a second sound part 12) has an area of a, and the contact surface has an area of b, where $3\%\ b \leq a \leq 10\%\ b$.

The area of the sound part accounts for 3% to 10% of the area of the contact surface, ensuring that the housing has a sufficient sound area. The area of the sound part is within a proper range, thereby reducing a case that sound transmission quality of a headset is affected due to sound leakage and the like in a using process of the headset as a result of a too large area of the sound part.

In a possible implementation, the contact surface may be arc-shaped, so as to fit to the skin of the human ear, the area of the contact surface is 250 square millimeters to 350 square millimeters, and the area of the sound part is greater than or equal to 10 square millimeters and less than or equal to 30 square millimeters.

The headset may include at least one headset body. The headset body can be worn on a left ear or a right ear. The headset body may be connected to an electronic device such as a mobile phone, a tablet computer, and a notebook computer in a wired manner, or may be connected to the electronic device in a wireless manner such as Bluetooth. At least a portion of the housing may be a hollow structure so as to form a cavity. In a specific implementation, the earbud 4 is a hollow structure with a cavity therein, a loudspeaker of the headset is mounted in the cavity of the earbud 4, and the loudspeaker may be a speaker component, configured to produce sound. The housing of the headset body may be the housing of the headset body according to any one of the foregoing. Because the housing of the headset body has the foregoing technical effects, the headset including the housing of the headset body also has the foregoing technical effects, which are not described in detail herein again.

In a possible implementation, the headset may include two headset bodies, a first sensor 2 and a second sensor 3 are disposed on each headset body, and the first sensor 2 and the second sensor 3 are mounted in the housing. Specifically, as shown in FIG. 7, when the housing has the earbud 4, the first sensor 2 and the second sensor 3 may be disposed on an outer surface of the earbud 4, namely, the side of the earbud 4 facing the auditory canal. Specifically, as shown in FIG. 7, the first sensor 2 is located on a side of the first sound part 11 away from the second sound part 12, and is configured to detect whether the first sound part 11 communicates with an auditory canal of the left ear. The second sensor 3 is located on a side of the second sound part 12 away from the first sound part 11, and is configured to detect whether the second sound part 12 communicates with an auditory canal of the right ear. Specifically, the first sensor 2 is disposed at a position close to the first sound part 11, and the second sensor 3 is disposed at a position close to the second sound part 12. Therefore, the first sensor 2 may detect a position thereof to learn of a position of the first sound part 11, and the second sensor 3 may detect a position thereof to learn of a position of the second sound part 12. The first sensor 2 and the second sensor 3 cooperate with each other to determine the positions of the first sound part 11 and the second sound part 12, so as to determine whether the first sound part 11 and the second sound part 12 are shielded by the skin of the human ear, further facilitating determining whether the first sound part 11 or the second sound part 12 communicates with the auditory canal to determine whether the headset is worn on the left ear or the right ear.

Specifically, as shown in FIG. 7, when the housing has a first through hole and a second through hole, the first sensor 2 is disposed on a side of the first through hole away from the second through hole, and the second sensor 3 is disposed on a side of the second through hole away from the first through hole. When the housing has a third through hole, the third through hole has a first side edge 13 and a second side edge 14. As shown in FIG. 5, in the width direction Y of the housing, the first side edge 13 and the second side edge 14 are disposed oppositely, that is, the first side edge 13 and the second side edge 14 are located on two opposite sides of the third through hole. The first sensor 2 is disposed on a side close to the first side edge 14, and the second sensor 3 is disposed on a side close to the second side edge 14. With such a design, the sensors detect relative positions of sound parts of a sound hole, so that a processor inside the headset or a processor of an electronic device in communication connection to the headset can determine, based on detected data of the sensors, which portions of the sound hole communicate with the auditory canal of the human ear, thereby determining whether the headset is worn on the left ear or the right ear.

Generally, videos, games, and the like usually have dual sound channels, so as to improve user experience and make a user have an immersive feeling. However, when the headset is worn on the human ear, it is necessary to determine whether the headset body is worn on the left ear or the right ear, and further adjust an output sound channel of the headset body, so that the headset body worn on the left ear outputs a left sound channel, and the headset body worn on the right ear outputs a right sound channel. Otherwise, use experience of the user is reduced. In the solution provided in this embodiment of this application, the first sensor 2 and the second sensor 3 are disposed on each headset body, so as to detect whether the headset body is worn on the left ear or the right ear.

When the headset is a wireless headset such as a Bluetooth headset, because the headset is provided with a power supply, the first sensor 2 and the second sensor 3 can start to work when the power supply of the headset is turned on. When the headset is a wired headset, the headset needs to be connected to an electronic device, so that a current can flow into the headset. In this case, the first sensor 2 and the second sensor 3 start to work to detect whether the headset body is worn on the left ear or the right ear based on detected data of the first sensor 2 and the second sensor 3. When the headset is a wireless headset, a detection result may be transmitted to a processor of the electronic device in a wireless manner such as Bluetooth. When the headset is a wired headset, the detection result may be converted into an electrical signal and the like, and transmitted to the processor of the electronic device by using a data line. The electronic device performs determining on the received data. A determining program that determines, based on the detection result, whether a corresponding headset body is worn on the left ear or the right ear is programmed in the processor of the electronic device. The processor controls an output sound channel, outputs, based on a determining result, the left sound channel to the headset body worn on the left ear, and outputs the right sound channel to the headset body worn on the right ear. The processor may be a central processing unit (central processing unit, CPU) of the electronic device.

The first sensor 2 and the second sensor 3 are disposed in the headset, so that the headset or the electronic device can determine, by using the first sensor 2 and the second sensor 3, whether a corresponding headset body is worn on the left ear or the right ear, thereby outputting a corresponding sound signal of the left sound channel or the right sound channel.

An embodiment of this application further provides an electronic device which may include a device body, a processor, a player, and a headset. The headset is connected to the device body in a wired manner or a wireless manner such as a Bluetooth connection. The device body may be a device that can use the headset, such as a mobile phone, a tablet computer, a notebook computer, or a desktop computer. The player is software that can play a file such as a video and audio (including an audio file and audio of software such as a game) inside the device body. The headset includes a first sensor 2 and a second sensor 3, the processor is configured to collect data of the first sensor 2 and the second sensor 3, and a determining program is programmed inside the processor. The determining program determines, based on a detection result of the first sensor 2 and the second sensor 3, whether a headset body is worn on a left ear or on a right ear. The processor outputs, based on the detection result, a left sound channel to a headset body on the left ear, and outputs a right sound channel to a headset body on the right ear.

With such a design, the headset can be interchanged between the left ear and the right ear in actual use, and can still receive a corresponding sound channel after the interchange, thereby improving use experience of a user.

In a possible implementation, when the headset is not worn, a Bluetooth headset power switch is turned on or a wired headset is electrically connected to the electronic device by using a data line, so that the headset starts to work. Because the headset is not worn on a human ear, the first sensor 2 detects that a first sound part 11 is not shielded, and the second sensor 3 detects that a second sound part 12 is not shielded. The first sensor 2 and the second sensor 3 transmit the detected data to the electronic device in a form of a wireless signal or an electric signal, and the processor of the electronic device may directly receive the electric signal or receive the wireless signal by using an antenna of the electronic device. The processor determines, by performing determining on the detected data, whether the headset is worn on a human ear. When the headset is worn on the left ear, the first sound part 11 communicates with an auditory canal of the left ear, the second sound part 12 is shielded by skin of the human ear, and the sensor may adopt a pressure sensor. The second sound part 12 is shielded by the skin of the human ear. Therefore, pressure received on the first sensor 2 near the first sound part 11 is relatively small, and the second sensor 3 near the second sound part 12 is extruded with greater pressure while in contact with the skin of the human ear. The first sensor 2 and the second sensor 3 transmit the data to the processor of the electronic device. The processor may determine, by comparing the pressure received on the two sensors, that the first sound part 11 communicates with the auditory canal, and further come to a conclusion that the headset is worn on the left ear. If bilateral headsets are in use, a headset on the other side needs to be detected. If the headset on the other side is worn on the right ear, pressure received on the first sensor 2 of the headset on this side is greater, and pressure received on the second sensor 3 is smaller. The processor can determine, by comparing the pressure received on the sensor of the headset on this side, that the headset is worn on the right ear, so that the processor controls the electronic device to output the left sound channel to the headset worn on the left side and output the right sound channel to the headset worn on the right side.

In a possible implementation, when bilateral headsets are used, the user may wear only a headset on one side in some cases, and the processor performs, based on detected data of the sensors, determining on the headset worn on the human ear to determine whether the headset is worn on the left ear or the right ear. A determining manner is the same as that in the foregoing implementation, which is not described in detail herein again. When the processor detects that only a headset on one side is worn on the human ear and the headset on the other side is not worn on the human ear, the processor controls the electronic device to simultaneously output the left sound channel and the right sound channel to the headset worn on the human ear regardless of whether the headset is worn on the left ear or the right ear, thereby improving sound transmission quality of the headset when the user only wears a headset on one side.

In a possible implementation, the processor is mounted in the headset. Specifically, the processor may be mounted in the headset body. After collecting the data of the first sensor 2 and the second sensor 3, the processor determines whether the headset body is worn on the left ear or the right ear to determine whether the left sound channel or the right sound channel is to be transmitted to the headset body. After determining that the headset body is worn on the left ear or the right ear, the processor sends a determining result to a device connected to the headset. The device transmits, based on the determining result, a corresponding sound signal of the left sound channel or the right sound channel to the human ear by using the corresponding headset body.

With such a design, the program inside the electronic device can be simplified, a possibility that the sensors of the headset do not match the processor of the electronic device is reduced, and practical use needs are better met.

Based on the foregoing headset and electronic device, an embodiment of this application further provides a sound control method for a headset. The sound control method includes:

S1: When a first sensor 2 of a headset body detects that a first sound part 11 communicates with an auditory canal of a left ear, a processor on the headset or the electronic device controls the electronic device to output a left sound channel to the headset body, the headset body receives a sound signal of the left sound channel and directly transmits the sound signal to the auditory canal of the left ear by using the first sound part 11; and when a second sensor 3 of the headset detects that a second sound part 12 communicates with an auditory canal of a right ear, the processor on the headset or the electronic device controls the electronic device to output a right sound channel to the headset body, and the headset body receives a sound signal of the right sound channel and directly transmits the sound signal to the auditory canal of the right ear by using the second sound part 12.

When the headset body is worn on the left ear, the second sound part 12 is shielded by skin of the human ear, sound transmission difficulty of the second sound part 12 becomes greater, and even sound cannot be transmitted to the auditory canal by using the second sound part 12; and when the headset body is worn on the right ear, the first sound part 11 is shielded by skin of the human ear, sound transmission difficulty of the first sound part 11 becomes greater, and even sound cannot be transmitted to the auditory canal by using the first sound part 11.

When in use, the headset body is first worn on the left ear or the right ear. When the headset is a wireless headset such as a Bluetooth headset, the first sensor 2 and the second sensor 3 can normally work only by starting a power supply of the headset. When the headset is a wired headset, the headset needs to be connected to the electronic device, so that a current flows into the headset, and the first sensor 2 and the second sensor 3 can normally work. The processor on the headset or the electronic device determines whether the headset body is worn on the left ear or the right ear by collecting data of the first sensor 2 and the second sensor 3 on the headset body, and feeds back a result. A corresponding sound channel is enabled by using an internal program of the electronic device, so that the headset can still output the corresponding sound channel while being interchanged between the left ear and the right ear, thereby improving use experience of a user.

Specifically, in a possible implementation, both the first sensor 2 and the second sensor 3 may be pressure sensors. The left ear and the right ear are different in structure. Therefore, when the headset body is worn on the left ear, pressure detected by the second sensor 3 is greater as the second sound part 12 is in contact with skin of the left ear, and pressure detected by the first sensor 2 is smaller as the first sound part 11 communicates with the auditory canal of the left ear. On the contrary, when the headset body is worn on the right ear, pressure detected by the first sensor 2 is greater as the first sound part 11 is in contact with skin of the right ear, and pressure detected by the second sensor 3 is smaller as the second sound part 12 communicates with the auditory canal of the right ear. The processor may determine, by comparing the pressure on the first sensor 2 and the second sensor 3, whether the headset body is worn on the left ear or the right ear.

It should be noted herein that the first sensor 2 and the second sensor 3 include but are not limited to pressure sensors. Another sensor such as a distance measuring sensor (measuring distances between the first and second sound parts and the skin of the human ear) that can sense whether the headset body is worn on the left ear or the right ear may be applied to the headset provided in the embodiment of this application, and have the same technical effects, which are not described herein again. In addition, the sensor may be disposed on an outer side of a housing or an inner side of the housing (for example, the sensor may be disposed on an inner wall of a cavity of an earbud 4, and when the headset is worn on the human ear, the earbud 4 generates elastic deformation, and the first sensor 2 and the second sensor 3 perform detection based on elastic deformation at different positions of the earbud 4, so that the processor can determine whether the headset is worn on the left ear or the right ear). The set position of the sensor may be designed based on an actual situation. When the sensor is disposed on the outer side of the housing, the sensor may be directly in contact with the skin of the human ear, so that the sensor can detect whether the headset is worn on the left ear or the right ear. When the sensor is disposed on the inner side of the housing, the housing can protect the sensor, thereby reducing a possibility that the sensor is damaged.

An embodiment of this application provides a headset. A first through hole and a second through hole may be disposed in a housing of the headset. When the headset is worn on a left ear, the first through hole communicates with an auditory canal, the second through hole is partially or completely shielded by skin of the human ear, and the first through hole is configured to propagate a sound signal to the human ear. When the headset is worn on a right ear, the second through hole communicates with an auditory canal, the first through hole is partially or completely shielded by skin of the human ear, and the second through hole is configured to propagate a sound signal to the auditory canal. With such a design, the headset can be interchanged for use between the left ear and the right ear, and regardless of whether the headset is worn on the left ear or the right ear, a sound hole of the headset can communicate with the auditory canal, thereby facilitating use and improving sound transmission quality.

The foregoing descriptions are merely preferred embodiments of this application, but are not intended to limit this application. For a person skilled in the art, various changes and variations may be made in this application. Any modification, equivalent replacement, or improvement made without departing from the spirit and principle of this application should fall within the protection scope of this application.

What is claimed is:

1. A headset comprising:
- a speaker component; and
- a housing containing the speaker component and comprising:
  - a housing body comprising:
    - a first through hole; and
    - a second through hole,
    - wherein the first through hole and the second through hole are configured to emit sound signals from the speaker component, and
    - wherein the first through hole and the second through hole are positioned such that:

the first through hole is not shielded by a skin of a user and the second through hole is partially or completely shielded by the skin when the headset is worn on a left ear; and the second through hole is not shielded by the skin and the first through hole is partially or completely shielded by the skin when the headset is worn on a right ear.

2. The headset of claim 1, further comprising:

a first sensor; and a second sensor, wherein the first sensor and the second sensor are configured to determine whether the headset is worn on the left ear or the right ear.

3. The headset of claim 2, wherein the first through hole comprises a first side located away from the second through hole, wherein the second through hole comprises a second side located away from the first through hole, wherein the first sensor is located on the first side, and wherein the second sensor is located on the second side.

4. The headset of claim 2, wherein the headset is configured to:

receive a left channel audio from an electronic device when the headset is worn on the left ear; and communicate with the electronic device.

5. The headset of claim 1, further comprising an earbud configured to extend into an auditory canal of the ear, wherein the first through hole and the second through hole are located on the earbud.

6. A headset comprising:

a speaker component; and a housing containing the speaker component and comprising:

a housing body comprising:

a through hole configured to emit a sound signal from the speaker component, wherein the through hole is positioned such that:

a first portion of the through hole is not shielded by a skin of a user and a second portion of the through hole is shielded by the skin when the headset is worn on a left ear; and a third portion of the through hole is not shielded by the skin and a fourth portion of the through hole is shielded by the skin when the headset is worn on a right ear.

7. The headset of claim 6, wherein a width of the through hole is 6 millimeters (mm) to 12 mm in a width direction of the housing.

8. The headset of claim 6, wherein an area of the through hole is greater than or equal to 10 square millimeters ($mm^2$) and less than or equal to 30 $mm^2$.

9. The headset of claim 6, further comprising:

a first sensor; and a second sensor, wherein the first sensor and the second sensor are configured to determine whether the headset is worn on the left ear or the right ear.

10. The headset of claim 9, wherein the through hole comprises:

a first side edge; and a second side edge, wherein the first side edge and the second side edge are disposed oppositely in a width direction of the housing, wherein the first sensor is proximate to the first side edge, and wherein the second sensor is proximate to the second side edge.

11. The headset of claim 9, wherein the headset is configured to:

receive a left channel audio from an electronic device when the headset is worn on the left ear.

12. The headset of claim 6, further comprising an earbud configured to extend into an auditory canal of the ear, wherein the through hole is located on the earbud.

13. An electronic device comprising:

a device body;

a headset coupled to the device body and comprising:

a first headset body comprising a first sound part and a second sound part;

a second headset body; and a sensor; and a processor coupled to the device body and the headset and configured to:

collect data of the sensor;

identify, based on the data, a detection result indicating that either: (1) the first headset body is worn on a left ear and the second headset body is worn on a right ear, or (2) the first headset body is worn on a right ear and the second headset body is worn on a left ear;

output, based on the detection result, a sound signal of a left sound channel to the first a headset body that corresponds to the left ear; and output a sound signal of a right sound channel to a headset body that corresponds to the right ear.

14. The electronic device of claim 13, wherein the sensor is configured to detect that the first sound part communicates with an auditory canal of the left ear, and wherein the first headset body is configured to receive a sound signal of the left sound channel.

15. The electronic device of claim 14, wherein the first headset body is further configured to transmit the sound signal to the auditory canal using the first sound part.

16. The electronic device of claim 13, wherein the sensor is configured to detect that the second sound part communicates with an auditory canal of the right ear, and wherein the second headset body is configured to receive a sound signal of the right sound channel.

17. The electronic device of claim 16, wherein the second headset body is further configured to transmit the sound signal to the auditory canal using the second sound part.

18. The electronic device of claim 13, wherein the first sensor is a pressure sensor.

19. The electronic device of claim 13, wherein the sensor is a distance measuring sensor.

20. The electronic device of claim 13, wherein the first sound part and the second sound part comprise a first through hole and a second through hole.

* * * * *